United States Patent [19]

Morris et al.

[11] 4,207,594
[45] Jun. 10, 1980

[54] ELECTRONIC INDIRECT MEASURING SYSTEM

[75] Inventors: John R. Morris, Bellefontaine Neighbors; Robert L. Grant, Bel Nor, both of Mo.

[73] Assignee: The United States of America as represented by the Secretary of the Air Force, Washington, D.C.

[21] Appl. No.: 817,641

[22] Filed: Jul. 21, 1977

[51] Int. Cl.² ............................................. H04N 7/18
[52] U.S. Cl. .................................... 358/107; 356/241
[58] Field of Search ........................ 358/100, 106, 107; 364/514, 560; 356/241

[56] References Cited

U.S. PATENT DOCUMENTS

| | | | |
|---|---|---|---|
| T945,006 | 6/1970 | Speck et al. | 358/107 |
| 3,261,967 | 7/1966 | Rosin et al. | 364/560 |
| 3,530,235 | 9/1970 | Bolton | 358/107 |
| 3,783,189 | 1/1974 | Nelson | 358/107 |
| 3,909,519 | 9/1975 | Page, Jr. | 358/107 |
| 4,053,928 | 10/1977 | Orton et al. | 358/107 |

Primary Examiner—Robert L. Griffin
Assistant Examiner—Joseph A. Orsino, Jr.
Attorney, Agent, or Firm—Joseph E. Rusz; Henry S. Miller

[57] ABSTRACT

A system and method of using a bore scope with an attached video system, the true field of view is measured, cross hair lines are generated on the video monitor and measured for extremes of field and again bracketing the object, a ratio is formed and is used as a multiplier of the true field of view. The result is the actual dimension of the object.

1 Claim, 2 Drawing Figures

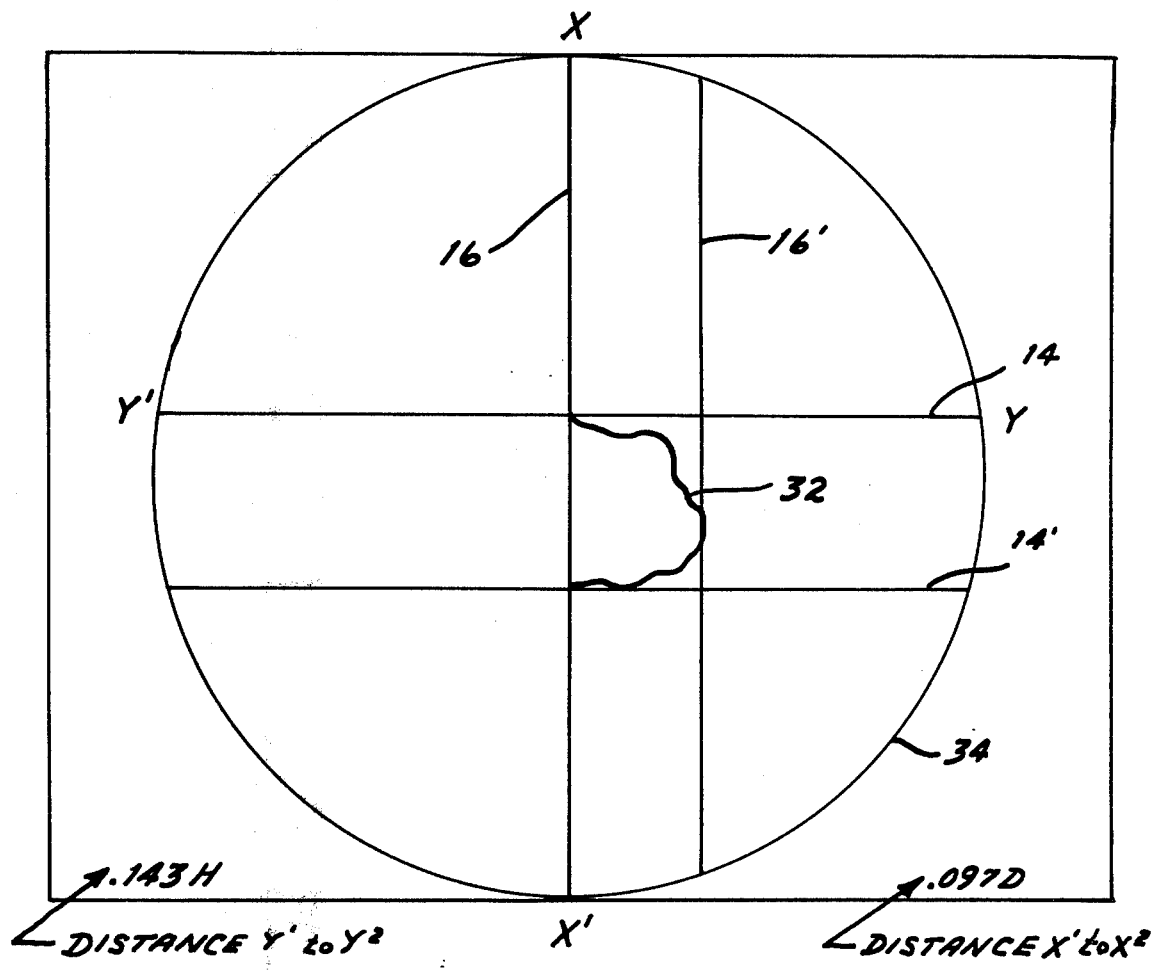

ELECTRONIC INDIRECT MEASURING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to non distructive testing and more specifically to a method and system for measuring the size of defects not otherwise capable of being directly measured.

Since the introduction of jet engines to aviation, damage to the compressor turbine blades by either foreign or domestic objects has been a big problem. Once a blade or blades other than in the first or last stages have been damaged, the engine must be torn down in order to measure the damage. In the more recent engines, apertures have been designed into the engines in critical areas so that with the aid of a borescope, the blades may be viewed optically and photographed with the aid of photographic attachments to the borescope. This allows a determination of the nature of the defect but not its size, which is a critical factor.

SUMMARY OF THE INVENTION

The invention utilizes conventional and known equipment, with some modification, to present a new method for indirectly measuring the size of defects in machines, engines and other devices. Utilizing a rigid borescope probe, modified to include a scale on the probe barrel, it becomes possible to measure changes in the probe insertion depth. This scale combined with the photographic capability of the borescope allows the development of a method for taking indirect measurements with reasonable accuracy. The borescope is manipulated in manner that will determine the true dimension of the field of view. Cross hairs are generated on the video monitor and moved to the extremes of the field of view and their position noted. The cross hairs are then repositioned, bracketing the object (defect) to be measured and this position noted. A ratio is established between the values noted for the positions of the cross hair and this ratio is used to multiply the true field of view.

The result of the multiplication along with other descriptive information is entered into the system and fed into a character generator whose output is then mixed with the video output of the camera to form a composite signal which is displayed on a monitor and recorded on video tape.

It is therefore an object of the invention to provide a new and improved electronic indirect measuring system.

It is another object of the invention to provide a new and improved method for indirect measuring.

It is a further object of the invention to provide a new and improved method for measuring defects in machines, aircraft engines and similar devices.

It is still another object of the invention to provide a new and improved method for indirect measuring that provides real time measurements while creating a permanent record.

It is still a further object of the invention to provide a new and improved method for indirect measuring that eliminates the use of graphs and manual computations required by known similar methods and systems.

It is another object of the invention to provide a new and improved method for indirect measuring which requires less time than other known similar methods.

It is another object of the invention to provide a new and improved system for indirect measuring which is economical to produce and assemble and utilizes conventional, currently available components.

These and other advantages, features and objects of the invention will become more apparent from the following description taken in connection with the illustrative embodiment in the accompanying drawing.

DESCRIPTION OF THE DRAWINGS

FIG. 2 is a representation of a measurement taken with the invention.

DESCRIPTION OF THE PREFERRED EMBODIMENT

Figure 1:
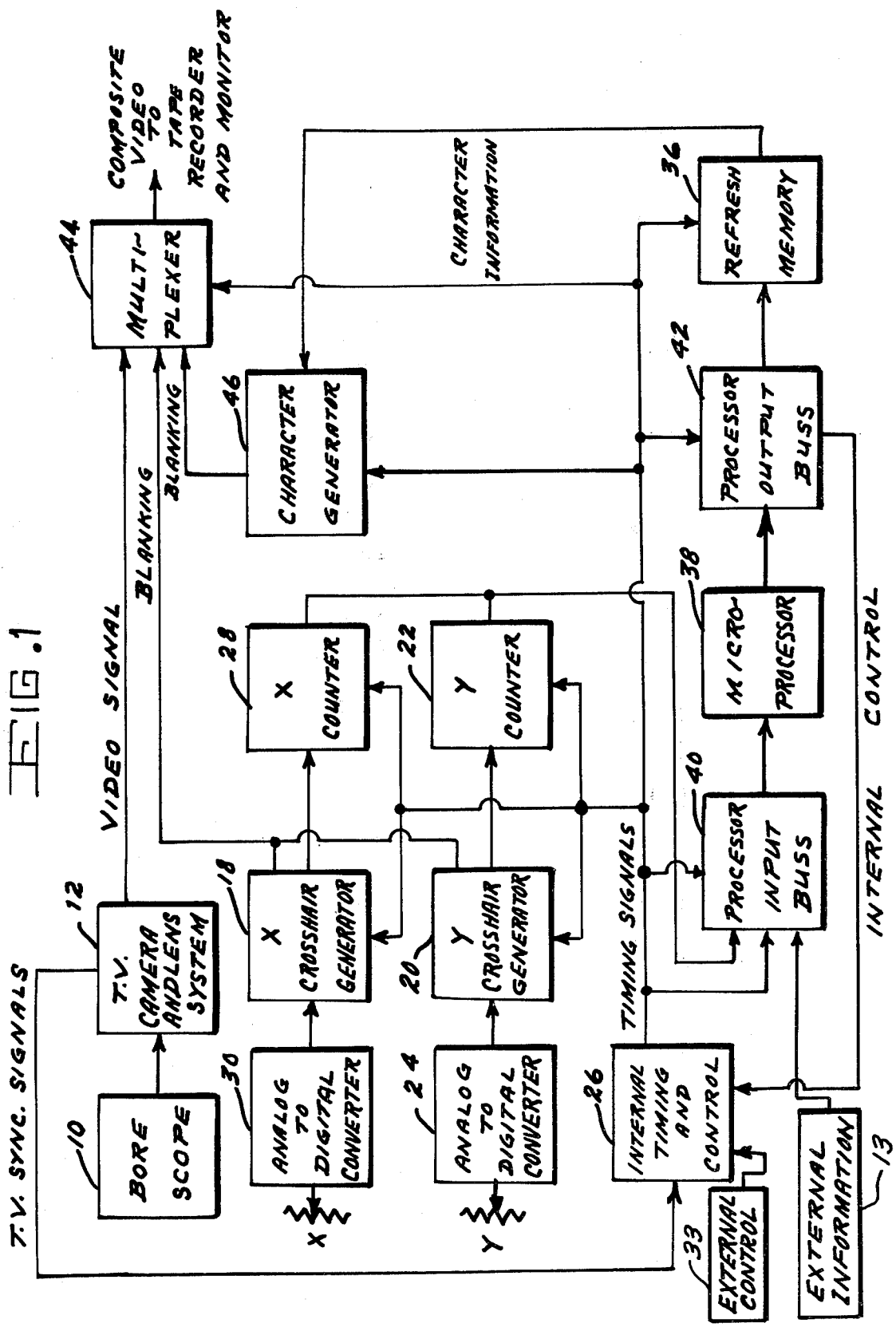
FIG. 1 is a representative block diagram of the method and system of the invention.

The system and method of the invention are shown in FIGS. 1 and 2. Referring now to the Figures, the borescope is shown at 10, utilizing a television camera and lens system 12 in place of conventional photographic attachments.

Using the conventional eyepiece, the borescope is moved in such a way as to position the object (defect) at the two extremes of the field of view. Relative movement required is manually entered into the system along with the angle that the plane of the defect deviates from a plane perpendicular in the line of sight of the borescope as external imformation 13. For example, the top of a defect in a turbine blade is positioned first at the top of scope field of view and the probe penetration dimension is recorded. The defect top is then positioned at the bottom of the scope field of view and the probe penetration dimension recorded. The latter dimension is subtracted from the former dimension and the result is the field of view.

Cross hairs are generated in the television system and view on the output monitor 14, 14', and 16, 16', The X and Y cross hairs are generated at 18 and 20 respectively, by blanking or enhancing the video signal at selected points. In the case of the Y cross hairs (16, 16') this is done on a line basis by counting (22) horizontal sync pulses and comparing them to a preset value 24. In the case of the X cross hairs, it is done on a point basis by measuring the time (26) relative to horizontal sync pulses and comparing it (28) to a preset value (30). The preset values are entered by operator position control in a digital format via analog to digital conversion (24,30).

The Cross hairs are positioned to the extremes of the field of view and a switch closed which enters their position into the system (external control 33). The cross hairs are then repositioned to bracket the object (defect) to be measured 32 and a switch closed which enters the new position of the cross hairs into the system (external control 33). The measurement of dimension on the video display 34 is accomplished by counting pulses between the blanking signals generated by the X and Y cross hair pairs. In the case of the Y cross hairs, these are the horizontal sync pulses and in the case of the X cross hairs, these are pulses generated by the stable internal clock 26.

The system then has the value for the field of view found manually entered and multiplies this by the ratio formed of the measurements taken of the extremes of the field of view and the object bracketed and the secant of the angle that the plane of the defect deviates from a plane perpendicular to the line of sight of the borescope. The result of these computations is the true object dimension. The result along with other descriptive information entered into the system is fed into a character generator 46 whose output is then mixed with the video output of the camera 12 to form a composite signal which is displayed on monitor 34 and recorded for future use on video tape.

Data processing in the system, including mathematical operation and data formating to refresh memory 36 is performed by a microprocessor 38 with input buss 40 and output buss 42.

The generation of the video display is accomplished by multiplexer 44 which selects one of the following signals as its output; video from the camera 12, blanking from cross hair generators 18 and 20 or blanking from character generator 46 refresh memory 36. Control signals for the multiplexer 44 are derived from decoding the output of a horizontal sync counter and a counter operating from an internal clock synchronized to to the horizontal sync pulses.

Although the invention has been described with reference to a particular embodiment, it will be understood to those skilled in the art that the invention is capable of a variety of alternative embodiments within the spirit and scope of the appended claims.

What is claimed is:

1. A method for electronic indirect measuring with a borescope, comprising the steps of:
   (a) manually measuring a first extreme field of view of a borescope relative to an object;
   (b) manually measuring a second extreme field of view of a borescope relative to an object;
   (c) recording the relative movement of the borescope between said first and second extreme fields of view;
   (d) affixing a video system, including a camera and monitor, to the borescope;
   (e) generating a plurality of cross hairs on the video system monitor;
   (f) displaying the borescope field of view on the monitor;
   (g) placing the cross hairs at the extreme of the borescope field of view;
   (h) measuring the field of view between the cross hairs;
   (i) calculating a ratio indicative of the difference in size of the manually measured borescope field of view and the monitor display borescope field of view using the recorded relative movement of the borescope and the distance measured between cross hairs;
   (j) adjusting the borescope to view an object;
   (k) bracketing the object with cross hairs on the monitor;
   (l) measuring the distance between the cross hairs;
   (m) and multiplying the bracketed measured distance by the said ratio to obtain the actual dimensions of the object.

* * * * *